(12) United States Patent
Shcherbakov

(10) Patent No.: US 11,368,077 B2
(45) Date of Patent: Jun. 21, 2022

(54) ELECTRIC MACHINE

(71) Applicant: Vadim Valerevich Shcherbakov, Ljubljana (SI)

(72) Inventor: Vadim Valerevich Shcherbakov, Ljubljana (SI)

(*) Notice: Subject to any disclaimer, the term of this patent is extended or adjusted under 35 U.S.C. 154(b) by 78 days.

(21) Appl. No.: 15/734,555

(22) PCT Filed: Jun. 4, 2018

(86) PCT No.: PCT/RU2018/000363
§ 371 (c)(1),
(2) Date: Dec. 2, 2020

(87) PCT Pub. No.: WO2019/235953
PCT Pub. Date: Dec. 12, 2019

(65) Prior Publication Data
US 2021/0234446 A1    Jul. 29, 2021

(51) Int. Cl.
| | |
|---|---|
| *H02K 1/28* | (2006.01) |
| *H02K 21/22* | (2006.01) |
| *H02K 1/20* | (2006.01) |
| *H02K 1/2786* | (2022.01) |
| *H02K 3/02* | (2006.01) |
| *H02K 3/12* | (2006.01) |
| *H02K 3/42* | (2006.01) |

(52) U.S. Cl.
CPC ............ *H02K 21/22* (2013.01); *H02K 1/20* (2013.01); *H02K 1/2786* (2013.01); *H02K 1/28* (2013.01); *H02K 3/02* (2013.01); *H02K 3/12* (2013.01); *H02K 3/42* (2013.01); *H02K 2213/03* (2013.01)

(58) Field of Classification Search
CPC ........ H02K 1/28; H02K 1/2786; H02K 21/22; H02K 21/12; H02K 2213/03
See application file for complete search history.

(56) References Cited

U.S. PATENT DOCUMENTS

| | | | | |
|---|---|---|---|---|
| 964,343 | A * | 7/1910 | Volkers | |
| 999,335 | A * | 8/1911 | Pennington | |
| 7,382,072 | B2 * | 6/2008 | Erfourth | H02K 21/22 310/156.43 |
| 9,188,115 | B2 * | 11/2015 | Fukasaku | H02K 7/04 |
| 2004/0124729 | A1 * | 7/2004 | Long | H02K 1/02 310/80 |
| 2015/0137647 | A1 * | 5/2015 | Hunstable | H02K 1/27 310/156.43 |

\* cited by examiner

*Primary Examiner* — Dang D Le

(57) ABSTRACT

It is described an electric machine with permanent magnets, which can function as a high torque and power per mass motor or generator. The machine includes a rotor and a stator. The rotor and the stator have spiral shape, the stator is located inside the rotor. The rotor contains at least two permanent magnets of different polarity, forming spirals around the stator. The stator contains a ferromagnetic core, on which the three-phase winding is spirally wound. This construction allows almost the entire winding to participate in torque generation. The cooling with a fluid medium inside the magnet core allows to remove heating from the entire length of the winding, which significantly increases the operating efficiency.

22 Claims, 8 Drawing Sheets

ELECTRIC MACHINE

TECHNICAL FIELD

The invention relates to electric machines, in particular to electric motors or generators with permanent magnets with a spiral construction of stator and rotor, the main advantage of which is the provision of high torque and power per mass.

BACKGROUND OF THE INVENTION

There are multiple application fields of apparatus powered by an electric motor, the performance efficiency of which in many ways depends on the weight of the motor itself. Examples include aircraft propeller motors, spacecraft equipment, wind turbines, electrical systems inside vehicle wheels, etc. There is a tendency to design and build electric motors with high unit power and performance.

The closest prior art of the claimed invention is the electric motor machine disclosed in US Patent No. 20040194286, comprising a rotor with a magnet assembly of at least two permanent magnets of different polarity and a stator with a core and a winding spirally wound on the core.

The disadvantage of this machine is the large size and heavy weight of the structure, caused by the low ergonomics of the stator and rotor units arrangement inside the machine casing, as well as the shape of the magnets, which does not allow to reduce the mass of the machine without reducing the torque value.

Technical Problem

The aim of the invention is the development of an electric machine, the constructive design of which will provide the possibility of achieving a technical result consisting in optimizing the rotor and stator units construction, which will allow to increase the torque value per mass unit of the electric machine.

The Solution of the Problem

The problem is solved by the fact that there has been developed an electric machine comprising a rotor with a magnet assembly of at least two permanent magnets of different polarity, and a stator located inside the rotor with a core and a three phase winding spirally wound thereon, wherein the permanent magnets form spirals around the stator. Each spiral consists of at least one magnet of the same polarity.

First of all, the technical result as claimed can be achieved due to the fact that the magnets form a dense spiral around the stator, which in combination with a winding spirally wound on the core makes it possible to shorten the circuit current path of the magnetic field, thereby increasing its intensity in the gap between the turns of the permanent magnet spirals and the turns of the winding spirally wound on the core.

It is preferable the embodiment of the invention in which the three-phase winding is represented by three separate coils for each phase, on each of which a sinusoidal or a trapezoidal AC voltage is applied, phase-shifted by 120°, and wherein each phase contains at least one conductive wire, configured to reduce eddy currents, the three-phase winding covering the whole core surface.

It is preferable the embodiment of the invention in which the number of the magnets in the magnet assembly should be even, wherein the magnet assembly contains at least one pole pair, and the magnet assembly is held by a magnet holder.

It is preferable the embodiment of the invention in which a ratio between the number of turns of the spirals in the magnet assembly and the number of turns of the spirally wound winding is 2:6, wherein the magnet holder is made of ferromagnetic steel.

The most preferable embodiment of the invention is the one in which the magnet assembly is a Halbach magnet assembly, wherein a ratio between the number of turns of the spirals of the magnet assembly and the number of turns of the spirally wound winding is 4:6, and the magnet holder is made of a material selected from the group, containing aluminium alloy, magnesium alloy, titanium alloy, carbon fibre, plastics.

It is preferable the embodiment of the invention in which the magnets in the magnet assembly are attached to each other and to the magnet holder an adhesive.

It is also preferable the embodiment of the invention in which the cross-section of the coil of each phase is generally circular or square.

It is also preferable the embodiment of the invention in which a channel for circulating a cooling fluid medium is formed inside the core, and the core itself is made either of ferromagnetic anisotropic laminated sheets of electrical steel, or of isotropic laminated sheets of electrical steel, or of an amorphous layered foil, or of materials with high magnetic permeability, or of an isolated powdered pressed soft magnet composite.

It is also preferable the embodiment of the invention in which a conductive part of the three-phase winding is made of a material selected from the group comprising copper, silver, aluminium, carbon nano tubes, nickel, steel, while in the case if a conductive part of the three-phase winding is made of aluminium, the insulation in it is made of ceramics by micro arc oxidation.

It is also preferable the embodiment of the invention in which the material connecting the turns in the spirally wound three-phase winding is either an epoxy resin, or a reinforcing epoxy resin, or a polyimide.

It is preferable the embodiment of the invention in which the slots are located on the core, wherein the height of the slots may be from 0% to 100% of the height of the conductive part of the phase in an insulation of the three-phase winding, while the turns of the spirally wound three-phase winding are at least partially located in the slots.

In the most preferable embodiment of the invention, the electric machine has the shape of a torus.

However, it will be apparent to those skilled in the art that the listed embodiments of the main features characterizing the claimed electric machine are merely exemplary and are not limiting and/or exclusive. The dimensions, proportions, shapes and outlines of the elements on the illustrations given in this document are represented schematically and may differ in the embodiments of the machine, depending on the design and the required set of functions.

BRIEF DESCRIPTION OF THE DRAWINGS

The claimed invention is explained using the drawings as below:

DESCRIPTION OF THE EMBODIMENTS

Figure 1A:
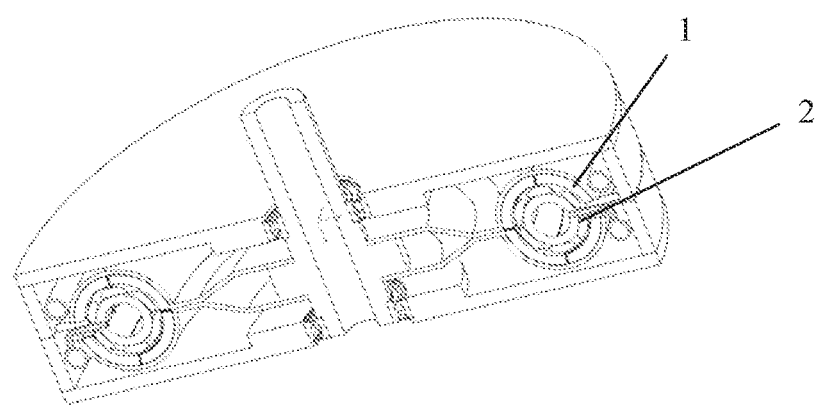
FIG. 1a, 1b, 1c—cross-sectional views of the electric machine with rotor and stator configurations of round, axial and radial cross sections.
Figure 1B:
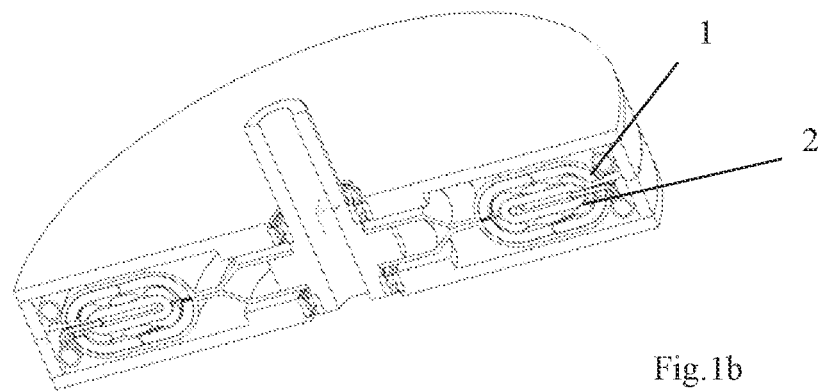
Figure 1C:
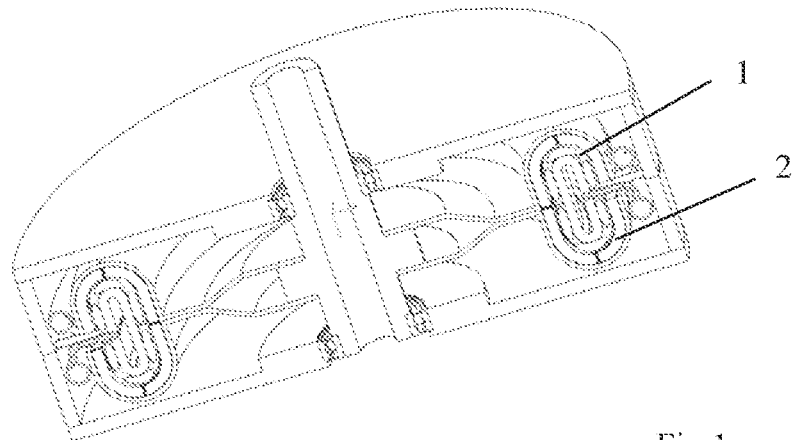

In FIG. 1A-1c three embodiments of the present invention are shown. The configurations have the same topological construction, but different shapes of the rotor (1) and the stator (2): round construction, axial construction and radial construction respectively.

Figure 2:
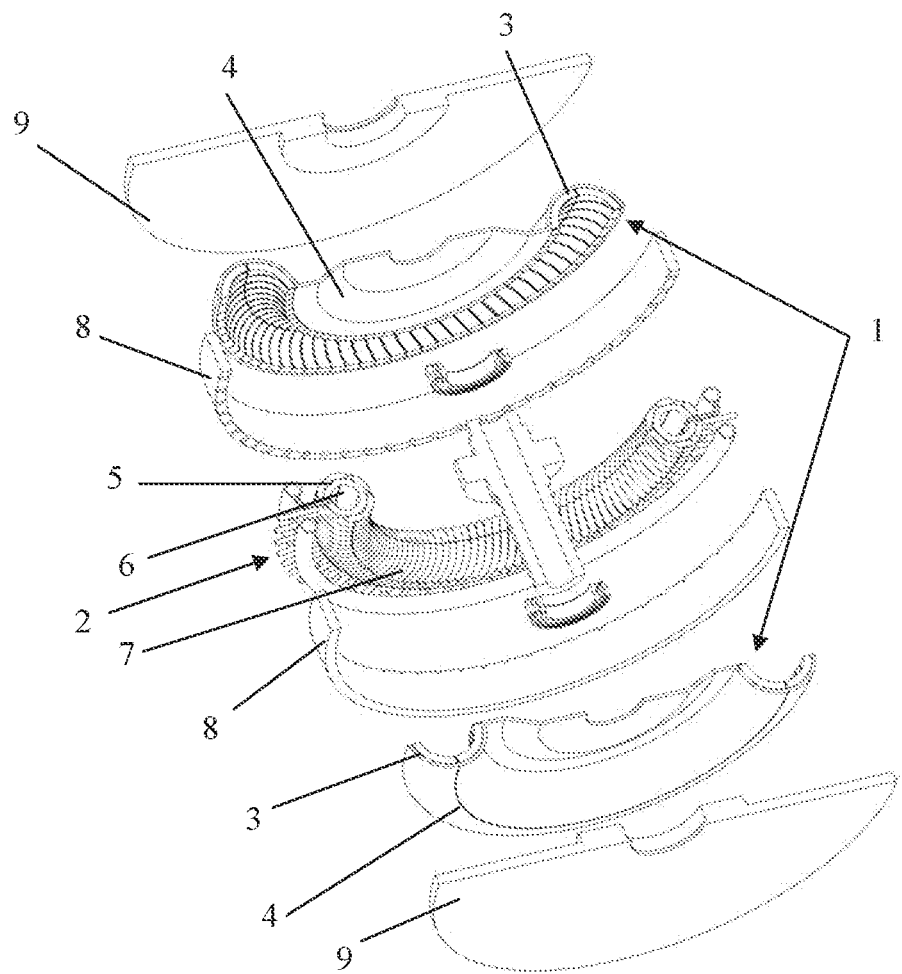
FIG. 2—an exploded view of an electric machine according to the present invention.

The FIG. 2 shows an exploded cross-sectional view of holder (4) and a stator (2) inside the rotor (1), with a core (5), in which a channel (6) is formed for circulating a cooling fluid medium and a three phase winding spirally wound thereon (7), the side (8) and end (9) walls of the electric machine casing, a shaft (10) fixed inside the electric machine casing by means of bearings (11) and (12), on which the rotational movement is transmitted from the rotor (1).

Figure 3:
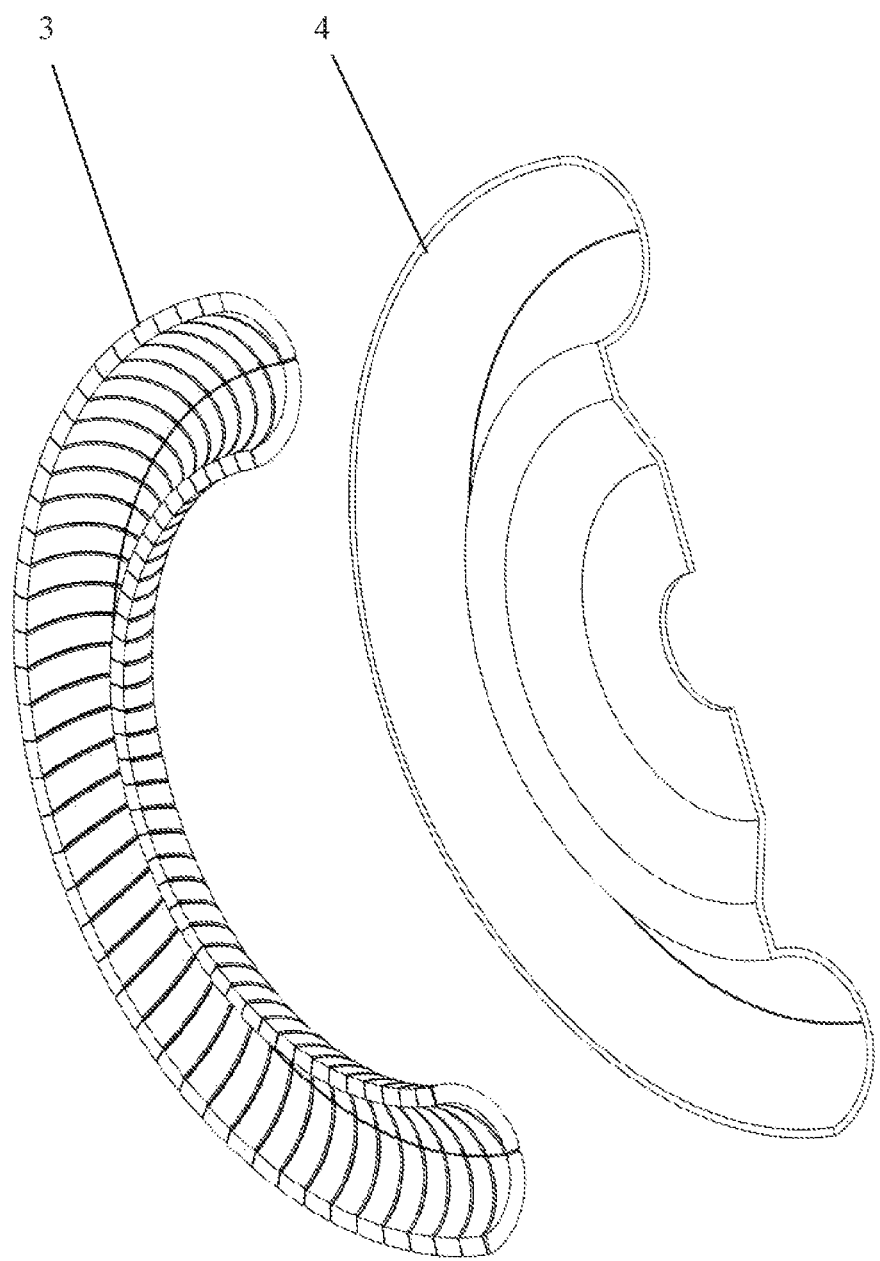
FIG. 3—a longitudinal-cross sectional exploded view of a magnet assembly and a magnet holder.

The FIG. 3 shows an exploded longitudinal-cross sectional view of the magnet assembly (3) and a magnet holder (4).

Figure 4:
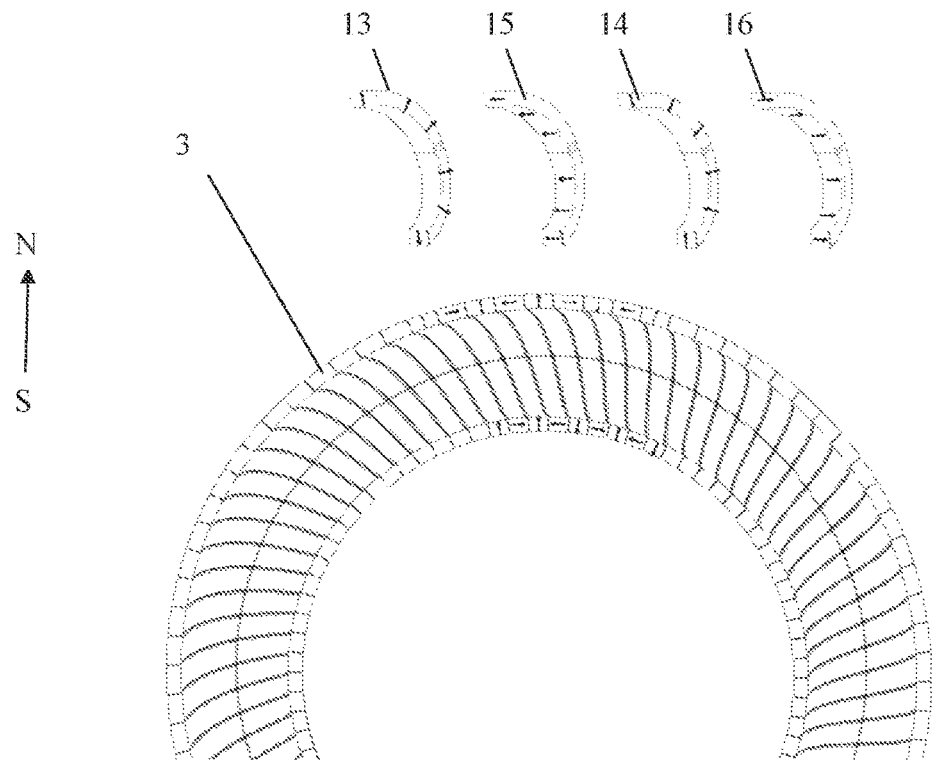
FIG. 4—a longitudinal sectional view of a Halbach Array type magnet assembly according to the present invention.

The FIG. 4 shows a longitudinal sectional view of a Halbach Array type magnet assembly (3), wherein the arrows indicate the polarity of the magnets in the magnet assembly (3). All magnets have the same shape, but four different polarities, two radial (13) and (14) and two tangential (15) and (16). As a result, the magnet field is concentrated on one side of the magnet assembly and is suppressed on the other side of the magnet assembly. The usage of ferromagnetic material is not necessary for the circuit field in the magnet holder (4). The minimal number of magnet poles for the Halbach Array type magnet assembly is four, the maximal—is not limited.

Figure 5:
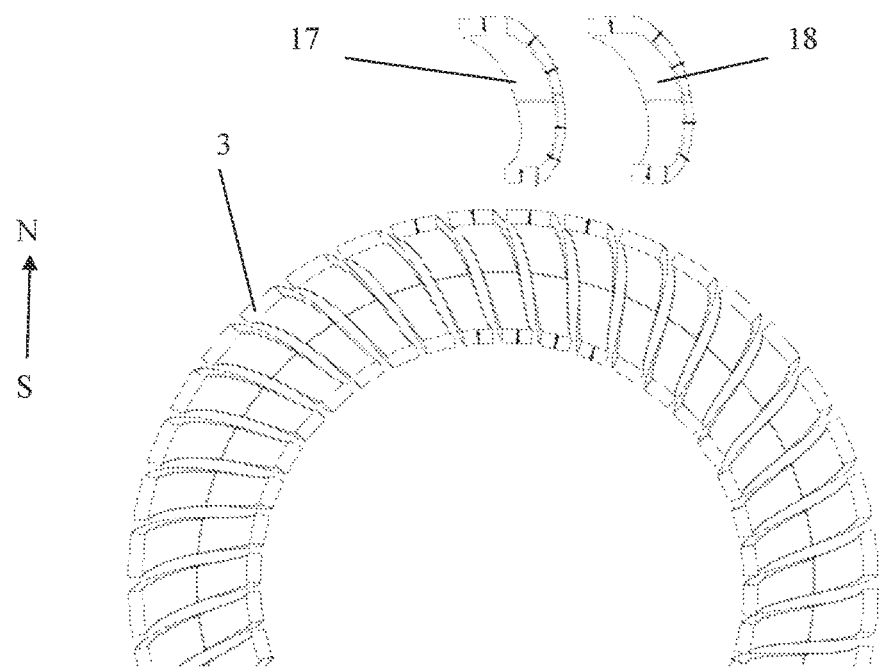
FIG. 5—a longitudinal sectional view of a standard type magnet assembly according to the present invention.

The FIG. 5 shows a longitudinal sectional view of a standard type magnet assembly (3), wherein the arrows indicate the polarity of the magnets in the magnet assembly (3). In the case of a standard magnet assembly (3), only two opposite radial polarities (17) and (18) are used. In this case, the magnet holder (4) should be made of a ferromagnetic material to form a magnetic field. The number of the magnets is twice less than in a Halbach Array type assembly. The minimum number of magnet poles is 2, the maximum is not limited.

Figure 6:
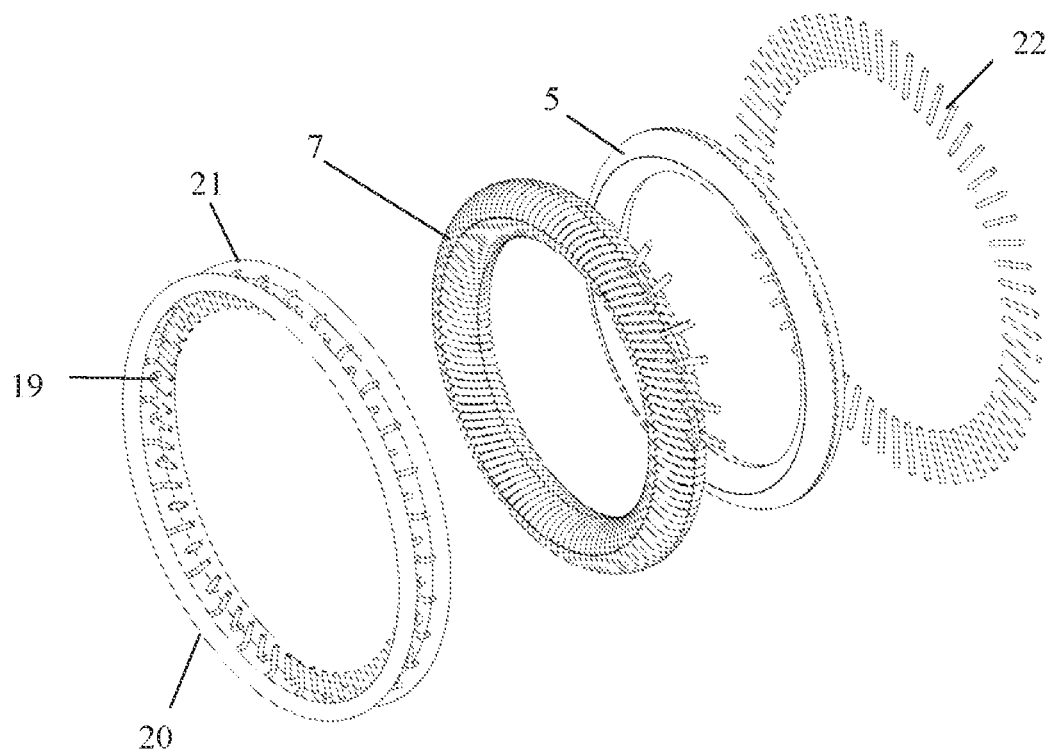
FIG. 6—an exploded view of a stator.

The FIG. 6 shows an exploded view of a stator with a core (5) which, first, forms a rigid framework for the three-phase winding (7), secondly, comprises a channel (not shown in the figure) formed therein for circulating a cooling fluid medium and, thirdly, circuits the magnetic field of the magnets. Also the FIG. 6 shows an element (19) comprising an input (20) and an output (21) of a channel for circulating a cooling fluid medium, connected to a core (5) and arranged along the periphery of the stator connecting pins (22) that fix the stator inside the electrical machine casing.

Figure 7:
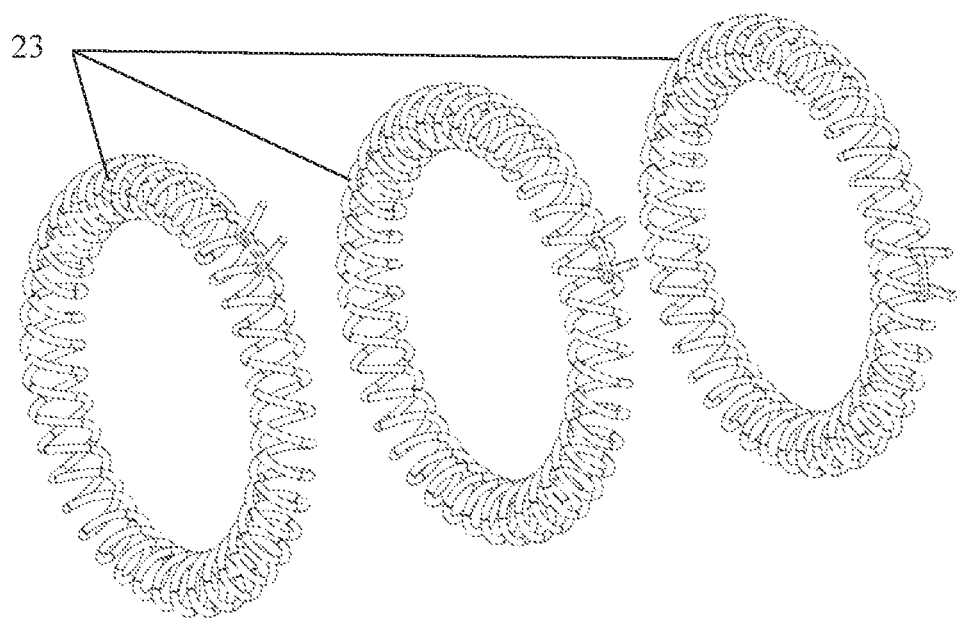
FIG. 7—a general view of the spirally wound three phase winding.

The FIG. 7 shows a view of the spirally wound three phase winding (23), wherein each coil (23) is being connected to a controller (not shown in the figure) that sequentially excites the phase winding and thereby rotates the rotor relative to the stator. The number of turns of each spiral on each coil (23) is equal to the number of poles in the rotor permanent magnets. Theoretically, the minimum number is 2, the maximum is limited only by the motor design.

Figure 8:
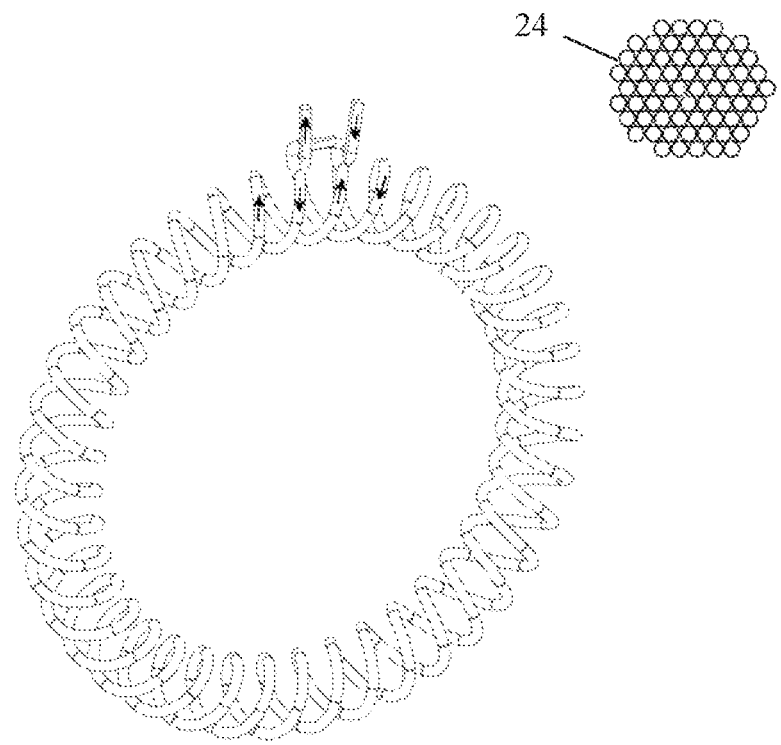
FIG. 8—a general view of a coil with a generally circular cross section.
Figure 9:
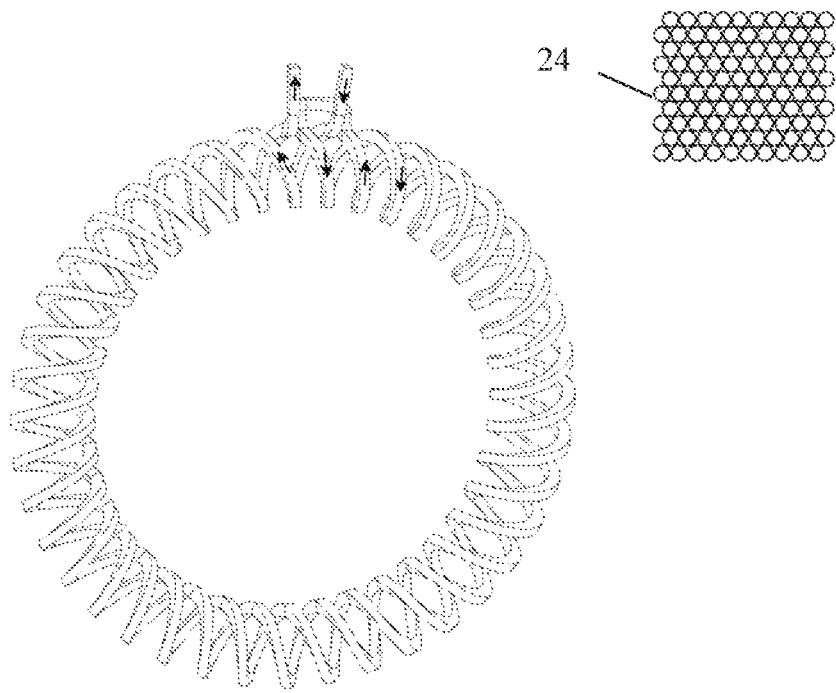
FIG. 9—a general view of a coil with a generally square cross section.
Figure 10A:
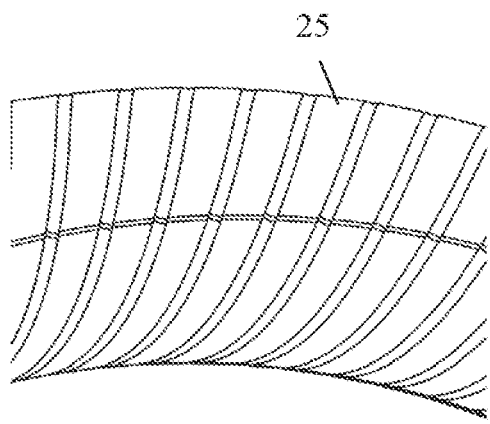
FIG. 10a, 10b, 10c, 10d—a view of core configurations with slots.
Figure 10B:
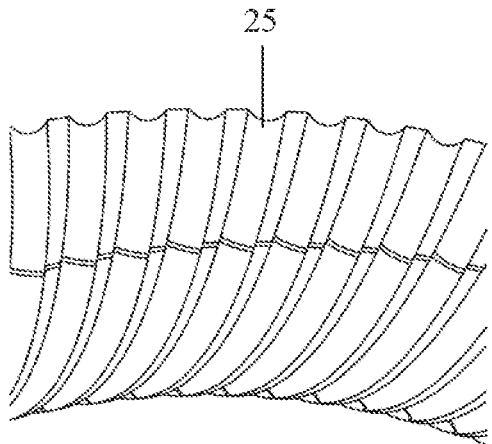
Figure 10C:
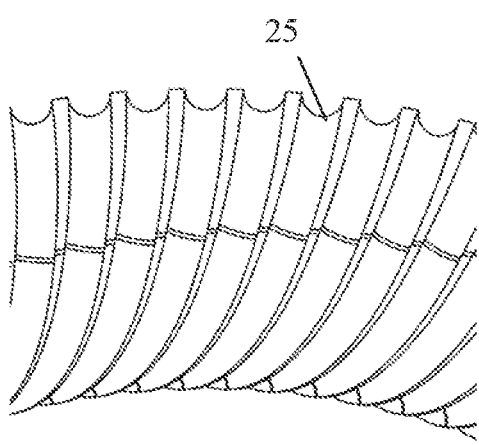
Figure 10D:
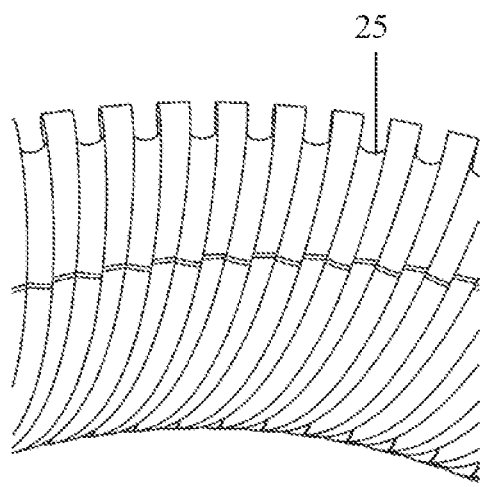

The cross-sectional shape of the coil in each phase generally can be both circular (FIG. 8) and square (FIG. 9). To reduce the losses caused by eddy currents within conductors, a Litz type wire should be used, which consists of a number of conductive wires (24). The spiral shape of the three-phase winding on the core makes it possible to achieve a very high space factor and to use it entirely in the torque generation.

The FIGS. 10a, 10b, 10c and 10d show the views of exemplary configurations of a core with grooves (25) for laying the three-phase winding, wherein their height can vary smoothly from 0% to 100% of the phase conductive part within the three-phase winding insulation.

Figure 11:
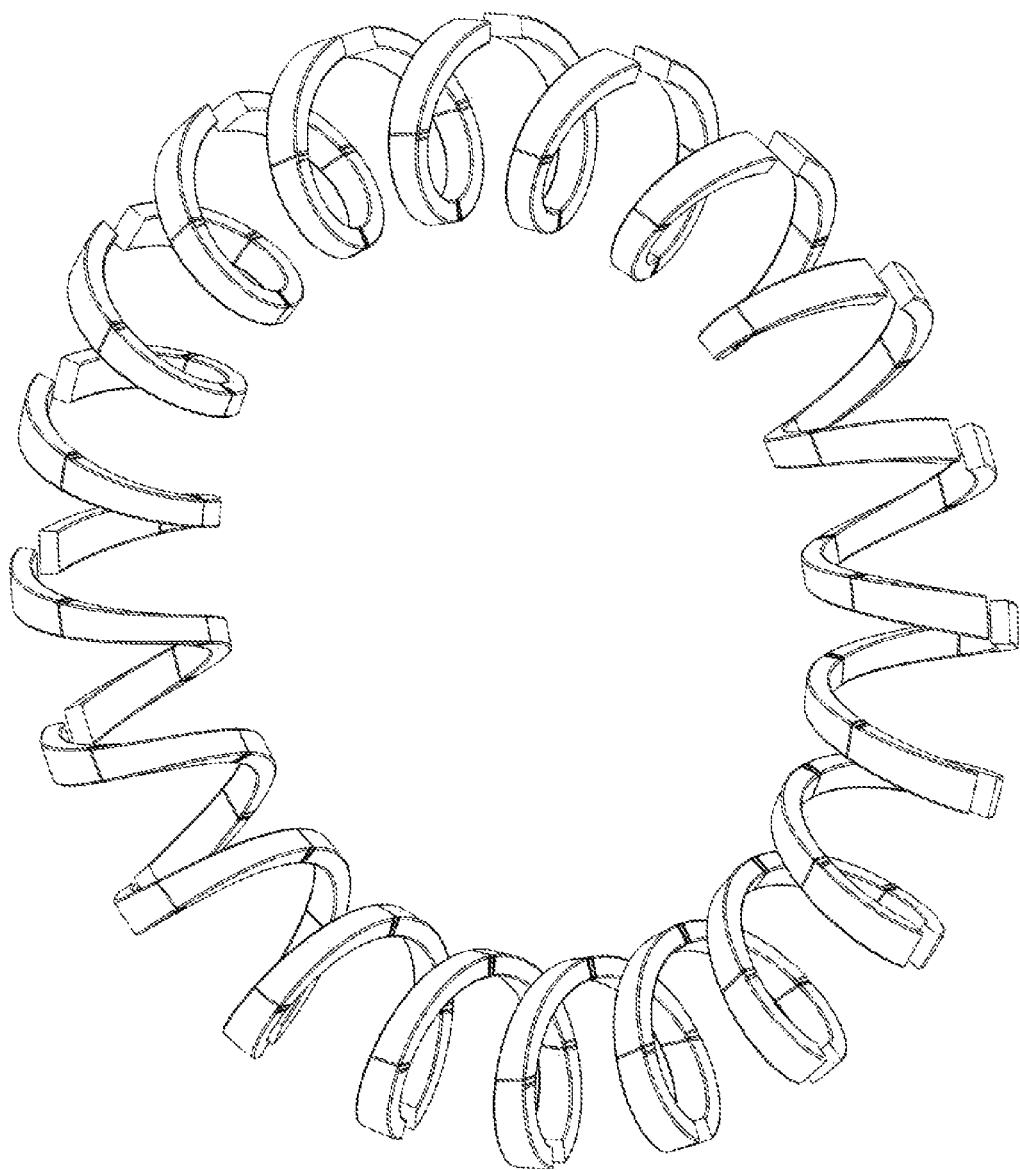
FIG. 11—a general view of a single-pole permanent magnet configuration.

The FIG. 11 shows general view of a single-pole permanent magnet configuration.

The electric machine operates as follows:

The present invention relates both to electric machines, in particular to both slotted and slot-less electric motors and generators. The operation principle of such motors is based on the Lorentz force acting on a conductor with magnet field. The assembly (3) of the permanent magnets of the rotor (1) generates a concentrated alternated magnet field inside the three-phase winding (7) spirally wound on the core (5) inside the stator (2). The number of the magnets should be even and they should be located in pairs at equal distances. The number of poles of the rotor (1) is determined by the dimensions of the motor and the torque that it should provide. The magnet field circuits through the core (5) in the stator (2). The three-phase winding (7) of the stator (2) includes three coils (23), where each coil is supplied with a sinusoidal or trapezoidal AC voltage phase-shifted by 120°. The current of the coils (23) of the stator (2) generated by the AC voltage inside the magnet field of the rotor (1) generates the tangential Lorentz force, which rotates the rotor. During a current change period the rotor (1) rotates according the two poles of the magnets. To operate the motor, the standard controllers for PMSM (permanent magnet synchronies motors) may be used.

Up to 95% of the coils, except for their upper part, are in a magnet field and participate in the torque generation. The suggested design of the electric machine has the maximal possible ratio of moving and stationary working winding parts for all the existing electric motors. Changing the height of the slot from 0 to the diameter of the winding wire makes it possible to create several motor variants. The slot-less motor can achieve high speed with high efficiency due to small losses in the core, and the slotted motor can achieve high torque at low speed.

Thus, the claimed invention is an electric machine, the constructive design of which will provide an opportunity to achieve a technical result consisting in optimizing the rotor and stator units design, which will increase the torque value per mass unit of said electric machine.

The invention claimed is:

1. An electric machine comprising a rotor with a magnet assembly of at least two permanent magnets of different polarity and a stator located inside the rotor and having a core and a three-phase winding spirally wound on the core, characterized in that the permanent magnets form spirals around the stator.

2. The electric machine according to claim 1, characterized in that the three-phase winding covers the whole surface of the core.

3. The electric machine according to claim 1, characterized in that a ratio between the number of turns of the spirals of the magnet assembly and the number of turns of the spirally wound three-phase winding is 2:6.

4. The electric machine according to claim 1, characterized in that the magnet assembly is a Halbach magnet assembly, wherein a ratio between the number of turns of the spirals of the magnet assembly and the number of turns of the spirally wound three-phase winding is 4:6.

5. The electric machine according to claim 4, characterized in that the magnet holder is made of a material selected from the group comprising an aluminium alloy, a magnesium alloy, a titanium alloy, a carbon fibre, and plastics.

6. The electric machine according to claim 1, characterized in that the number of the magnets in the magnet assembly is even.

7. The electric machine according to claim 1, characterized in that the magnet assembly is held by a magnet holder.

8. The electric machine according to claim 7, characterized in that the magnet holder is made of ferromagnetic steel.

9. The electric machine according to claim 7, characterized in that the magnets in the magnet assembly are attached to each other and to the magnet holder by an adhesive.

10. The electric machine according to claim 7, characterized in that the magnet holder is made of a material selected from the group comprising an aluminium alloy, a magnesium alloy, a titanium alloy, a carbon fibre, and plastics.

11. The electric machine according to claim 1, characterized in that the three-phase winding is represented by three separate coils for each phase, each coil being supplied with sinusoidal or trapezoidal AC voltage, phase-shifted by 120°.

12. The electric machine according to claim 11, characterized in that the cross-section of the coil of each phase is a generally circular or square cross-section.

13. The electric machine according to claim 1, characterized in that each phase comprises at least one conductive wire configured to reduce eddy currents.

14. The electric machine according to claim 1, characterized in that a channel for circulating a cooling fluid medium is formed inside the core.

15. The electric machine according to claim 1, characterized in that the core is made either of ferromagnetic anisotropic laminated sheets of electrical steel, or of isotropic laminated sheets of electrical steel, or of an amorphous layered foil, or of high magnetic permeability materials, or of an isolated powder compacted soft magnet composite.

16. The electric machine according to claim 1, characterized in that a material that bonds turns of the spirally wound three-phase winding is selected from the group comprising epoxy resin, reinforcing epoxy resin, and polyimide.

17. The electric machine according to claim 1, characterized in that a conductive part of the three-phase winding is made of a material selected from the group comprising copper, silver, aluminium, carbon nanotubes, nickel, and steel.

18. The electric machine according to claim 17, characterized in that, when aluminium is chosen as the material of a conductive part of the three-phase winding, an insulation in the three-phase winding is made of ceramics by micro arc oxidation.

19. The electric machine according to claim 1, characterized in that the magnet assembly comprises at least one pole pair.

20. The electric machine according to claim 1, characterized in that slots are provided on the core, the height of the slots being from 0% to 100% of the height of a conductive part of a phase in an insulation of the three-phase winding.

21. The electric machine according to claim 20, characterized in that turns of the spirally wound three-phase winding are at least partially located in the slots.

22. The electric machine according to claim 1, characterized in that the electric machine has the shape of a torus.

\* \* \* \* \*